US005509486A

United States Patent [19]

Anderson

[11] Patent Number: 5,509,486

[45] Date of Patent: Apr. 23, 1996

[54] METHOD OF STEERING AN AGRICULTURAL VEHICLE

[75] Inventor: David P. Anderson, Burnsville, Minn.

[73] Assignee: Loral Corporation, New York, N.Y.

[21] Appl. No.: 289,606

[22] Filed: Aug. 12, 1994

[51] Int. Cl.$^6$ .......... A01B 63/00

[52] U.S. Cl. .......... 172/6; 56/10.2 E; 172/5

[58] Field of Search .......... 172/2, 3, 6, 7, 172/9, 4, 4.5, 5; 364/424.07; 382/1, 43, 16; 56/10.2 D, 10.2 F, 10.2 E

[56] References Cited

U.S. PATENT DOCUMENTS

| | | | |
|---|---|---|---|
| 4,507,910 | 4/1985 | Thornley et al. | 56/10.2 E |
| 4,741,042 | 4/1988 | Throop et al. | 382/1 |
| 4,866,641 | 9/1989 | Nielsen et al. | 414/699 X |
| 4,937,878 | 6/1990 | Lo et al. | 382/1 |
| 5,019,983 | 5/1991 | Schutten et al. | 56/10.2 F X |
| 5,033,378 | 8/1991 | Chen | 382/1 |
| 5,077,806 | 12/1991 | Peters et al. | 382/1 X |
| 5,100,229 | 3/1992 | Lundberg et al. | 172/4.5 X |
| 5,115,628 | 5/1992 | Garter et al. | 56/10.2 E |
| 5,155,983 | 10/1992 | Sheehan et al. | 56/10.2 E |
| 5,174,385 | 12/1992 | Shinbo et al. | 172/4.5 |
| 5,181,572 | 1/1993 | Andersen et al. | 56/10.2 F X |
| 5,195,144 | 3/1993 | Le Parquier et al. | 382/1 |
| 5,327,345 | 7/1994 | Nielsen et al. | 172/4.5 X |
| 5,341,437 | 8/1994 | Nakayama | 382/1 |
| 5,359,666 | 10/1994 | Nakayama et al. | 382/1 |

*Primary Examiner*—Terry Lee Melius
*Assistant Examiner*—Victor Batson
*Attorney, Agent, or Firm*—Glenn W. Bowen

[57] ABSTRACT

The invention described herein uses the periodicity of the relative height of the surface of a crop or soil surface that is measured over a large area to control the position of a farm vehicle as it passes between rows of crops. The range and angle of return wave energy that are caused by a scanning beam of energy that sweeps across the crop canopy are measured. Signal processing techniques are employed to utilize the range and angle information to derive steering correction signals to control the farm vehicle. There is no contact with the crop and, therefore, there is no entangling with the crop or weeds with the invention. In addition, a plurality of heights are simultaneously determined across the path of the vehicle which are averaged by signal processing techniques. In this manner local anomalies due to weeds, clumps of soil, damaged or missing plants and erosion will not confuse the device or decrease its accuracy.

3 Claims, 7 Drawing Sheets

METHOD OF STEERING AN AGRICULTURAL VEHICLE

FIELD OF THE INVENTION

The invention is related to the determination of the position of an agricultural vehicle with respect to rows of crop or soil and more particularly to the determination of such position using the periodicity of surface contour information of such crops.

BACKGROUND OF THE INVENTION

Typically, a cultivator driver wishes to drive between the rows of plants, such as immature soybean plants, but the driver cannot see individual plants or even identify the rows very well because they are obscured by weeds. When the driver can see the plants, the fatigue of doing so is very great after a few hours. This invention is useful to survey crop rows and to provide fine steering corrections so that the vehicle stays centered when driving between rows.

It is necessary to position the blades of a cultivator so they are centered exactly midway between the crop rows. The allowable margin of error consists of only the width of the soil between the rows which is not occupied by the roots of the crop. Because the spread of the roots is approximately equal to the canopy width of the crop, the farmer uses the crop's canopy as a visual guide to steer the machine. As the crop matures and the roots spread, the margin for error is reduced until an accuracy of only a few inches remains, and steering mistakes cause crops to be damaged or weeds to be missed.

For these reasons various mechanical means to assist row guidance have been developed. Past practice includes a heavy metal ball which is dragged between the rows. In ridge-tilled crops, the ball rolls to the low point between rows which tends to be midway between rows. A mechanical arm that is attached to the ball operates a hydraulic valve which sends steering corrections to the cultivator to keep it centered between the rows. This device works well when rows are well defined. When they are not, it is inaccurate. At its worst, it can skip to the next row and it can also be upset by weeds.

Another practice uses mechanical wands which sense the distance to the crop's stalks on either side of the device. It is frequently used on corn crops which have well defined stalks. This device, however, tends to give false readings when in contact with weeds.

An acoustical range sensor device is sometimes used. This sensor also tracks the mid-point between single rows but, because it contacts only one point of the soil surface at a time, it can be confused by weeds or other irregularities in the soil surface. Its main advantage is that it cannot become entangled in weeds.

SUMMARY OF THE INVENTION

The invention utilizes a range sensor that preferably has a narrow beam-width and is mounted high and in front of the vehicle. It swings its beam through an arc perpendicular to the path of the vehicle, so that many rows are intersected by the beam. The sensor's output is sampled and stored in the computer's memory as an array of range versus angle. A coordinate conversion is then performed by the computer software to transform this array into an array of projected heights above an arbitrary flat horizontal surface versus distance along the surface. As the vehicle moves forward, the range sensor performs another scan of the ground in front of the vehicle. The range sensor's output is sampled again and a second array of height versus distance is computed and stored.

One embodiment uses a computer to compute by known cross-correlation computation. The offset of the peak in the cross-correlation function is a measure of the position of the vehicle with respect to the average row position within the field of view of the range sensor. A smooth offset signal is multiplied by a units conversion factor and the offset becomes a steering command.

The invention is usable on fields which have parallel lines that define where crops should grow, including fields covered by mature crops which completely cover the soil, fields containing newly emergent crops which have very small plants and plowed fields having no crop at all. Since the invention uses information about the periodicity of the spacing of crop plants and the non-periodicity of weeds, it can even be used on fields dominated by weeds.

BRIEF DESCRIPTION OF THE DRAWINGS

The present invention is described by reference to the drawings in which.

DETAILED DESCRIPTION OF THE INVENTION

Figure 1:
FIG. 1 is a side view looking parallel to the ground of a plurality of rows of a crop without weeds.
Figure 2:
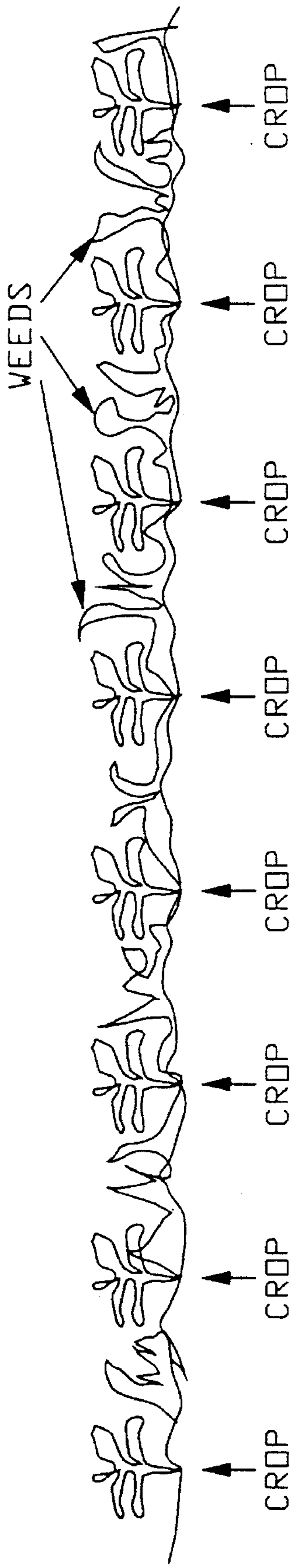
FIG. 2 is a side view looking parallel to the ground of a plurality of rows of a crop mixed with weeds.
Figure 3:
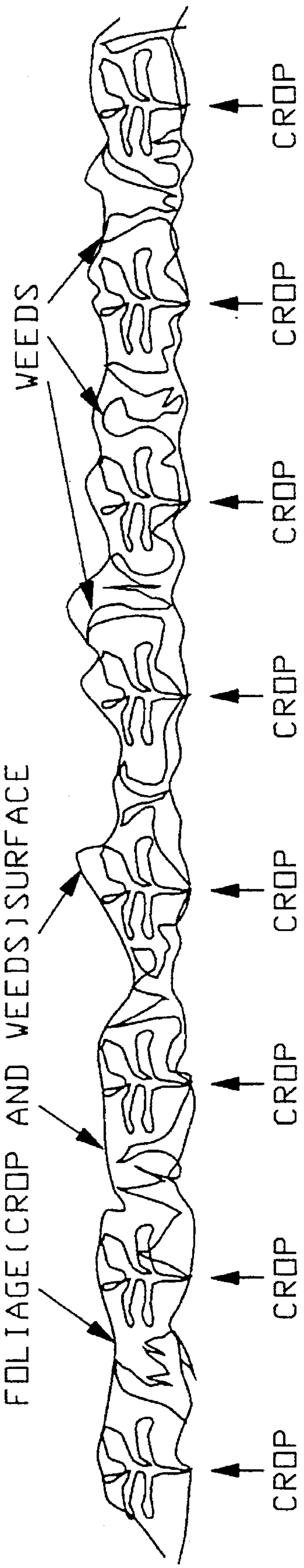
FIG. 3 is a side view which shows the surface contour of a plurality of rows of a crop mixed with weeds.

The invention is described by reference to the drawings which show in FIG. 1 how soybeans or other crops are planted at a fixed and known inter-row spacing. When weeds grow, they can be as thick and as tall or taller than the bean plants, as shown in FIG. 2. The surface of the soil, crop and weed foliage combination may have the same periodicity as the crop or may be non-periodic. The crop itself is periodic and coherent while the weeds are non-periodic and non-coherent, and possibly random. The surface contour, or canopy, of the soil-crop-weed combination, therefore, contains both periodic components from the crop and non-periodic components from weeds, as shown in FIGS. 2 and 3.

Figure 4:
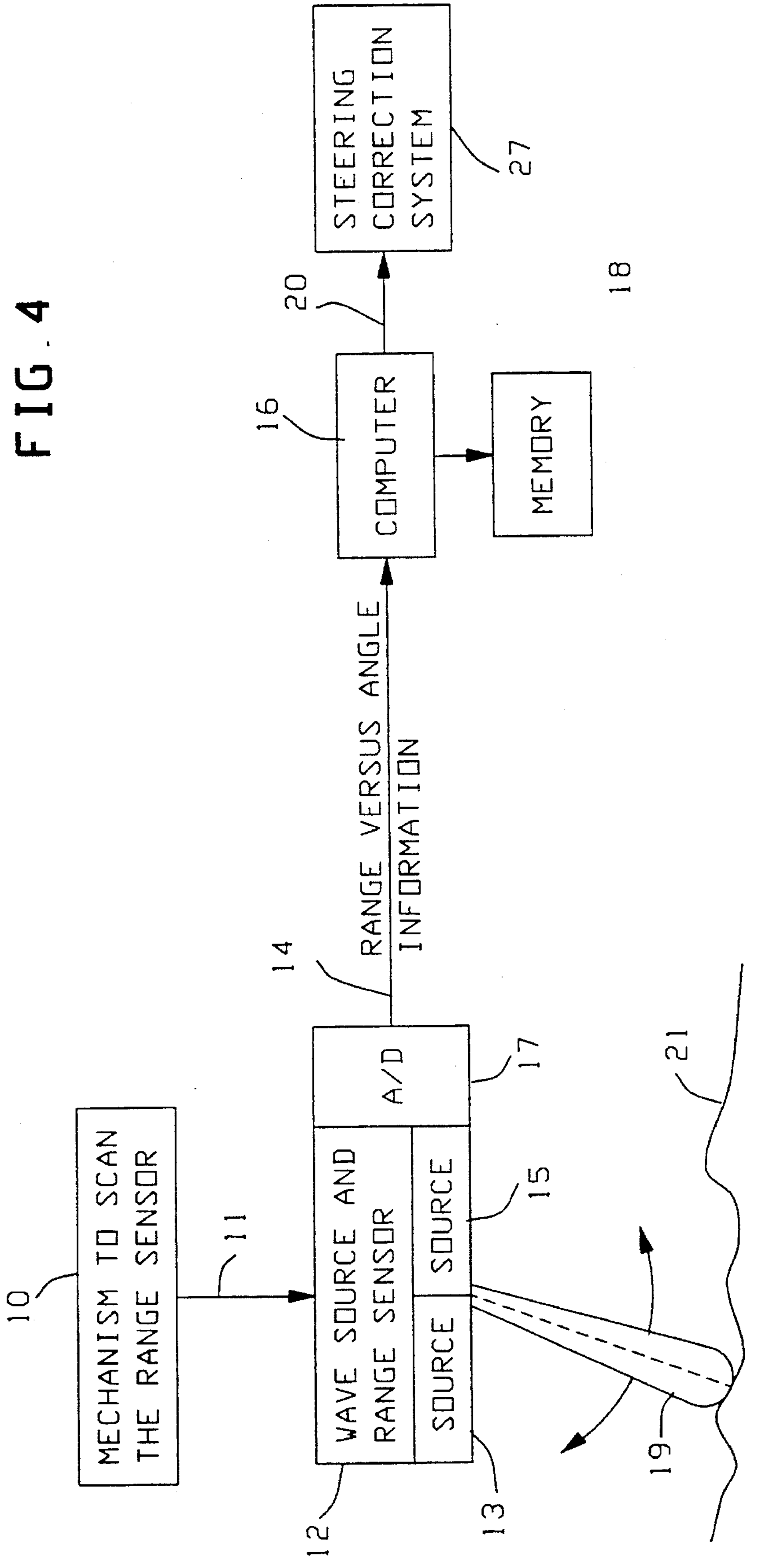
FIG. 4 is a block diagram of an embodiment of the row-following system.

The hardware components of the row-following device of the present invention are shown in FIG. 4. A scanner 10 of a conventional design is coupled over the line 11 to a wave source and range sensor 12. The element 12 includes a source 13 of wave energy, such as a laser, laser diode, red source, infrared source or other available light source that is useful in scanning the energy beam from a source over the targets. The source may also be an acoustic energy source. The element 12 also contains a sensor 15 capable of receiving reflected or fluorescent light. The range sensor may include conventional sensors, such as photo-diode detecting devices or other commercially available detectors or acoustical sensors if they generate sound wave energy.

Various types of sensors may be alternately used. These include microwave range sensors which are impervious to dirt and dust, are very reliable and have power levels that are below OSHA maximum levels, and ultrasonic sensors are also available which have narrow beam-widths and a range of 50 feet.

Beam-width of wave source should be smaller than the width of the plant in order to distinguish the crop as a feature. Newly emergent plants require the narrowest beam width. If the same beam-width is used at all times, accuracy will vary with plant size, the larger the plant, the greater the accuracy becomes. This is fortunate because as the root structure expands, greater row-centering precision is required to prevent root damage during cultivation.

The element 12 also may include an analog-to-digital converting circuit 17 for converting the information received from the crops and weeds into electrical signals. These signals are coupled over an electrical line or an optical path, as indicted by the line 14, to the digital computer 16. Alternately, analog information could be transmitted directly to the computer and the D/A conversion may take place at the input to the computer 16.

The element 12 also desireably contains a low-pass filter to remove the Nyquist frequency components that are out of the selected band of signals being processed from the range sensor. The output of this filter is then sampled by the A/D converting circuit 17 to provide a cutoff frequency that matches the beam width in order to satisfy Nyquist's criterion. A beam width of 12 inches at 30 feet and 64 8-bit samples per sweep and a sweep rate of one scan per second are typical.

The computer 16 is shown as having a separate memory 18 coupled to the computer over the cable 25 for purposes of emphasizing that the information received by the computer 16 will be stored in memory. The memory 18, of course, alternately could be integrated directly into the computer 16. The output of the computer 16 is preferably sent over an electrical line 20 to provide steering corrections to an automatic steering system 27 which is available for use on agricultural vehicles.

Figure 5:
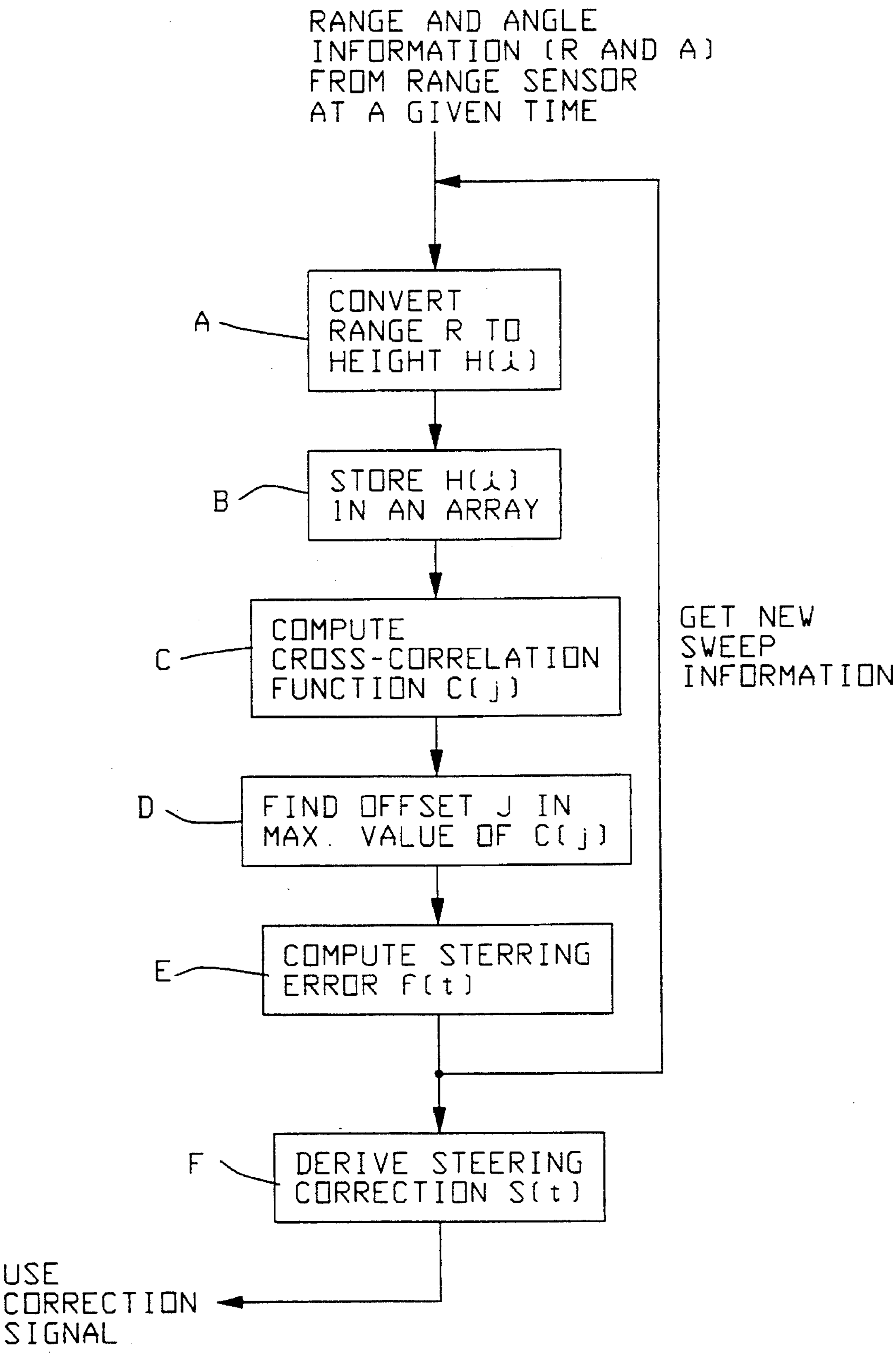
FIG. 5 is a flow diagram of a software process embodiment that implements the invention by using the cross-correlation function.

FIG. 5 illustrates the operation of a software process that is employed by the computer 16 to process the wave information that is received back from the crop and the weeds. The wave energy from the range sensor is swept in the beam 19, preferably in steps from one extreme of its sweep to the other in equal increments. Each increment of the sweep is designated by i, where i is an integral number that designates sweep steps. The number of steps employed are a function of sensor resolution and crop size. The invention may be implemented with 64 steps, for example for slow-moving vehicles, i may range from 1 to 64.

For each range sensor position in a sweep, input range and angle information (R and A) is obtained from the sensor 15, where R= the distance from sensor to the canopy of the surface as measured by the sensor, and A=the angle of the sensed beam from a vertical.

Available range sensors provide this type of information, whether derived from a light source, a microwave source or an acoustical source.

Figure 6:
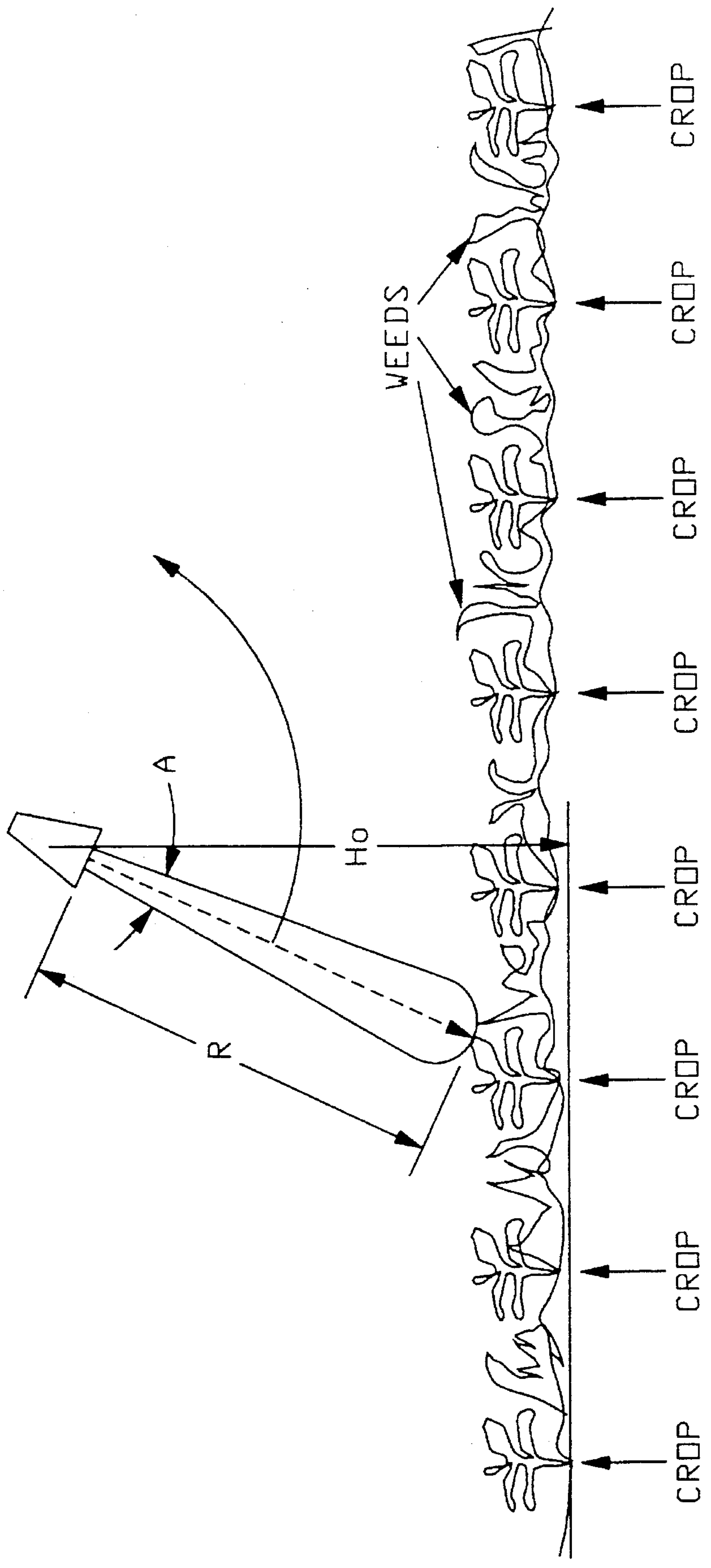
FIG. 6 is a side view which shows the sweep of the range sensor over the surface of a plurality of rows of a crop mixed with weeds.

The digital computer operates under the control of the signal processing algorithm that is illustrated in FIG. 5. At process step A the received R information is converted to height information H(i) at each of the sweep positions, i=1 to 64, according to the formula:

$$H(i)=HO-R*\cos A$$

where HO–vertical height of sensor above soil and * indicates multiplication. (See FIG. 6.)

At process step B, the information H(i) for each sweep position for one complete sweep is stored in a 64-bit array in the memory 18.

At process step C the cross-correlation function, C(j), j=–15 to +15 is computed between H(i) and H'(i). H(i) is the value of the height information during the current sweep, H'(i) is the height information from the previous sweep and j are the offsets of the cross-correlation function. The technique of computing a cross-correlation function is well known in signal processing art. The offset, J, of the max value of the cross-correlation C(j) is now computed by known techniques in process step D. Steps C and D allow for periodic information to be extracted from the information received by the range sensor. Other known periodic extraction techniques could be implemented, if desired.

At step E the raw steering error of the vehicle, f(t) is computed where:

$$f(t)=J*K, \text{ where}$$

t=current time in sweeps, and k=a system constant which converts f(t) to inches, centimeters or any preferred dimensional unit of steering error.

By Step F the process is completed for one sweep, and the steering error f(t) may then be smoothed over time with a first-order recursive filter by techniques known in the processing field. This will reduce the effects of vibration and instantaneous measurement error before the steering correction function S(t) is developed where:

$$S(t)=S(t-1)*K1+f(t)*(1.0-K1)$$

where K1= the time constant of the filter and $0 \leqq K1 \leqq 1.0$.

S(t) is then presented to a display for viewing by the operator or to an automatic steering unit which uses the correction function directly.

As the vehicle moves forward by a small distance, a new wave energy sweep will be initiated. The actual amount of distance may be found by experiment and may vary with the type of rows being followed, but is not generally critical. At the end of each process, step F and the H(i) for array are redesignated as H'(i) and information for a new array is obtained for the current sweep. The process is then repeated until the end of the crop now is reached.

Figure 7:
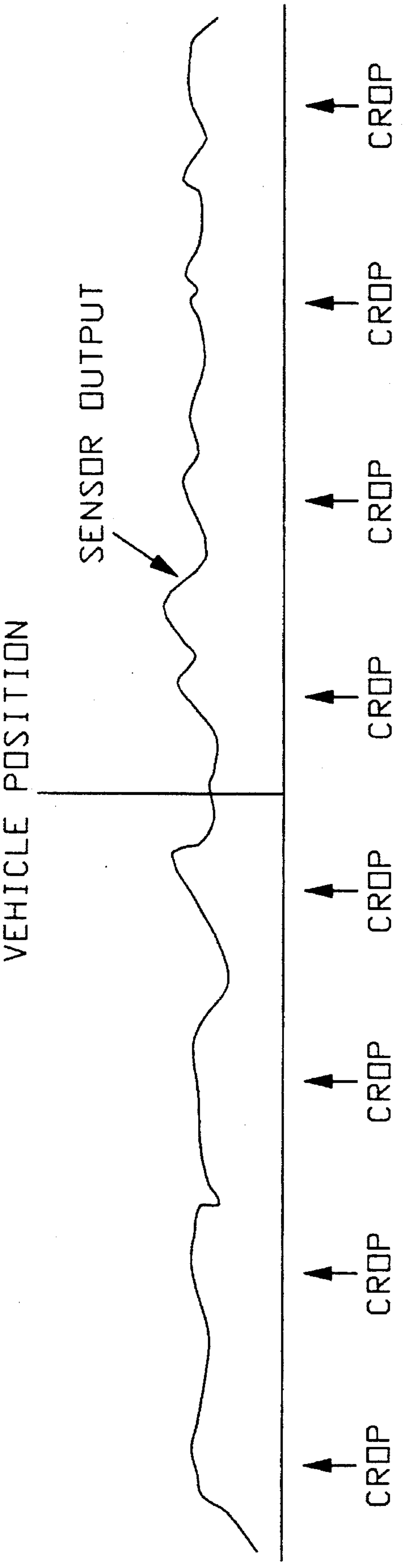
FIG. 7 is a side view chart which shows the surface contour of a plurality of rows of a crop mixed with weeds as measured by a range sensor.

The contour of the surface of the foliage is scanned by the range sensor which may sweep through approximately a 90-degree angle, (45 degrees to either side), to cover many rows on each scan, as shown in FIG. 7. Each scan may then be converted, by known prior-art algorithms, from non-uniform angular samples to equally spaced horizontal distance samples. This converts angle and range information from the sensor to height above the ground information as a function of distance along the ground. The output is then a time series whose amplitude is the contour of the foliage measured in a straight line perpendicular to the path of the vehicle.

Figure 8:
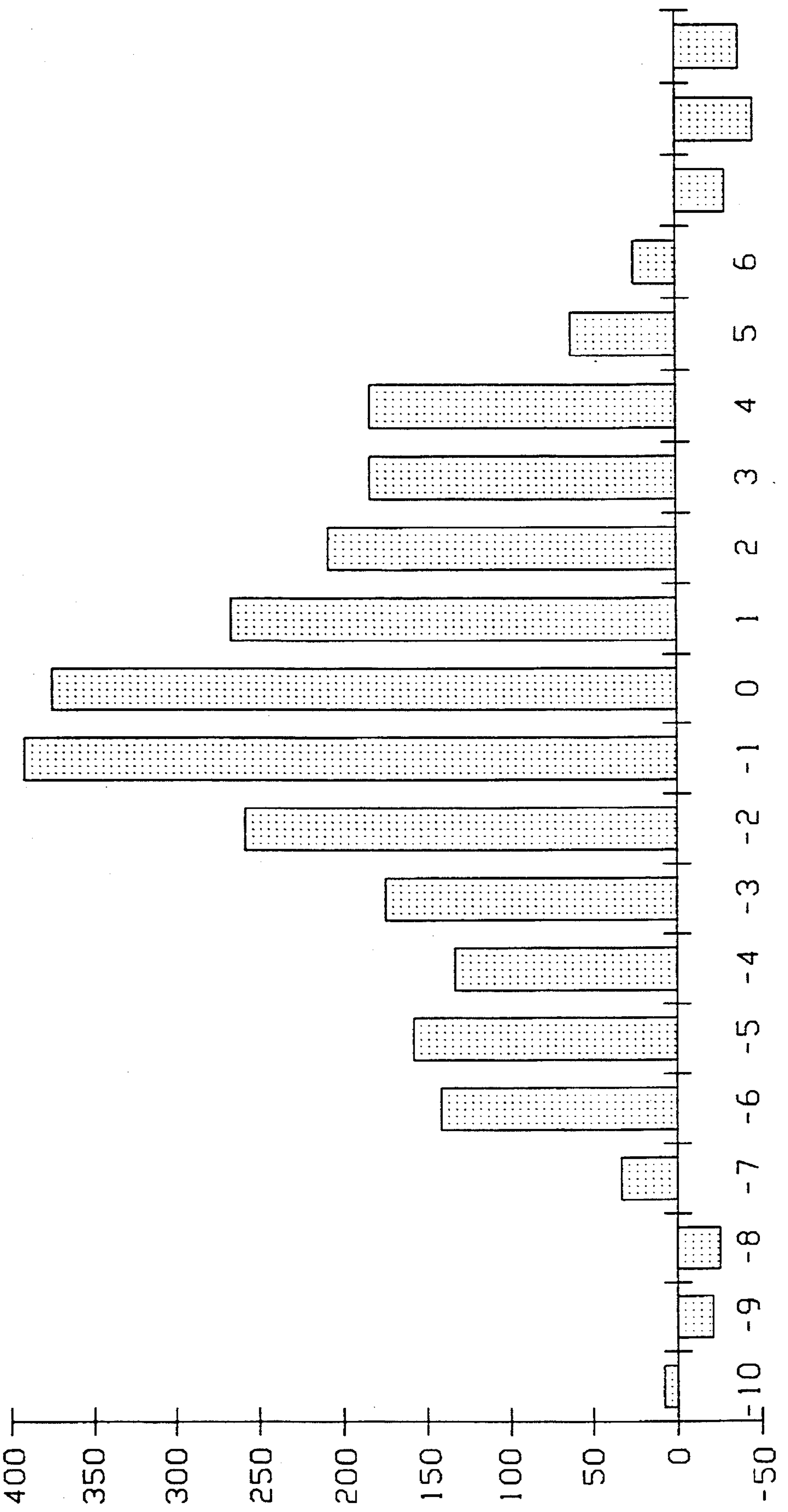
FIG. 8 is a bargraph, or histogram, which shows the cross-correlation function of two successive scans of the range sensor.

Extracting the periodicity in the signal due to the crop consists of extracting periodic signals from non-periodic noise. As previously noted, the range signal from the range sensor is preferably low-pass filtered and sampled. This sampling should occur at a rate that is at least twice the cutoff frequency in order to capture all the information in the signal without fold-over. A sample of the result is shown in the bargraph or histogram of FIG. 8.

This information is saved in the computer's memory 18. As the vehicle advances a few feet further down the field, a second scan is sampled. Cross-correlation may next be computed by a digital computer and known algorithms using both of these signals. This calculation shows correlation between the two signals as a function of the offset, (i.e., left/right or horizontal shift), of one signal with respect to the other. Periodic components common to the two signals will cause peaks to appear in the cross-correlation function. Lesser peaks due to harmonics will also appear at offsets which are integer multiples of these peaks. But the offset at which the largest peak appears is an indication of the left-right shift which the periodic component (the crop row spacing) has undergone while the vehicle has moved forward. Each increment of offset is one horizontal sampling distance, so the offset is a direct measure of how far off course the vehicle has strayed between samples.

Figure 9:
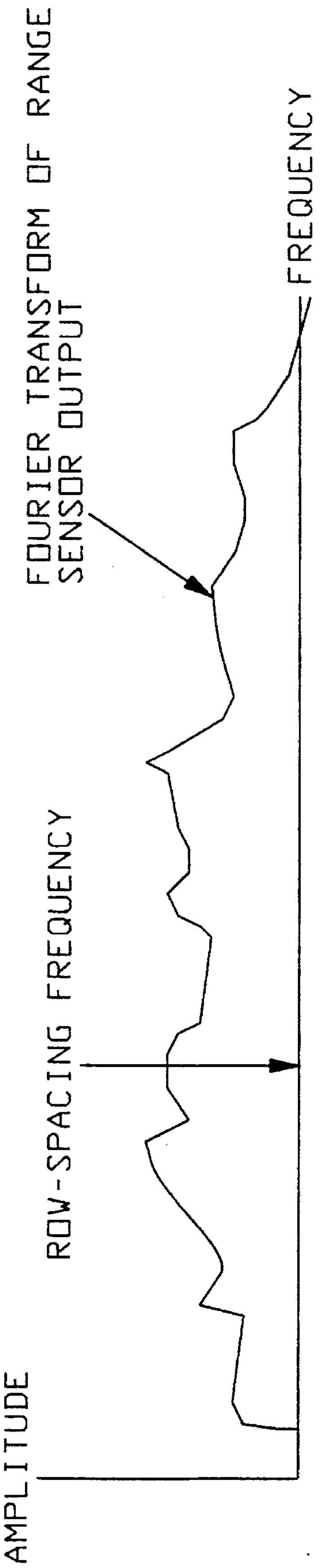
FIG. 9 is a line graph which shows the Fourier amplitude spectrum of the surface of a plurality of rows of a crop mixed with weeds.

As an alternative to the cross-correlation function, complex Fourier transform algorithms may be employed where the complex terms are converted to magnitude and phase These require only the data from one scan of the range sensor instead of two. The amplitude spectrum of such a transform is illustrated in FIG. 9. Amplitude peaks in the Fourier spectrum correspond to periodicities in the contour of the foliage, including harmonics. The spectrum of any one sweep is likely to be very noisy, but a peak will appear at the frequency of the row spacing even if the weeds tend to be taller than the crop.

Figure 10:
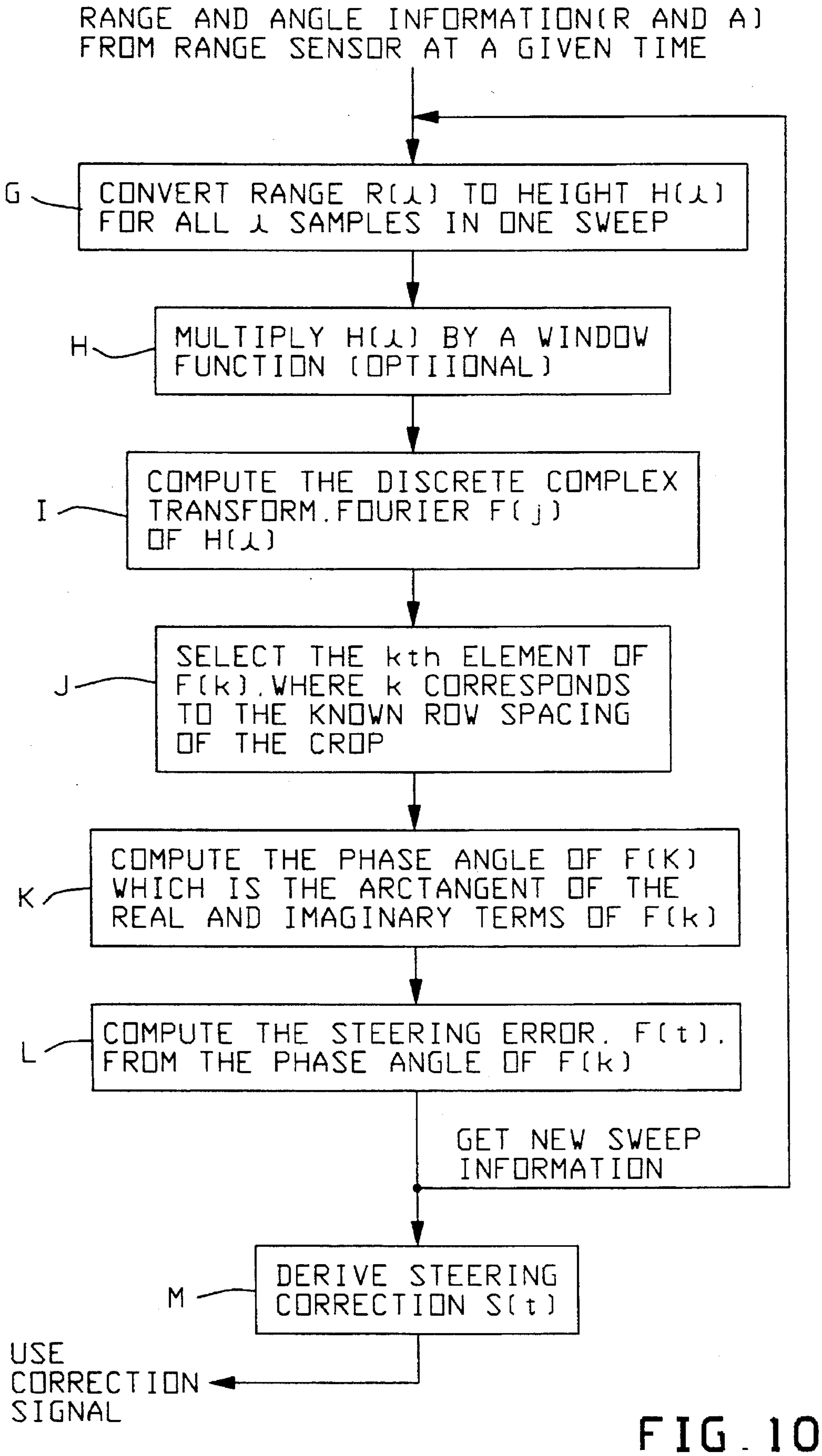
FIG. 10 is a flow diagram of another embodiment that shows a software process that implements the invention by using the Fourier transform for auto correlation.

FIG. 10 illustrates the operation of an alternative software process which substitutes the Fourier transform for autocorrelation. The range and angle data is sampled the same, as described with reference to FIG. 5, and range is then converted to height at Step G, where i represents each step of the sweep. Then, instead of computing the cross-correlation function, H(i) may optionally be multiplied by a window function, such as the Hamming or Hanning window in Step H. This will reduce the sidelobes of the spectral F(k) lines of the spectrum. The complex Fourier transform is next computed by known techniques in Step I. The kth element of F(k) which represents the known row spacing of the crop is selected at Step J. The value of k is determined by the width of the sweep, the number of samples in the sweep, the geometry of the mounting of the range sensor and the method of converting range to height.

The phase angle is then computed from the arc tangent of the ratio of the real and imaginary terms of the selected element in Step K. The phase angle varies from −180 degrees to +180 degrees. A phase angle of 0 degrees indicates that the vehicle is positioned midway between the crop and the adjacent inter-row space, whereas a phase angle of −90 degrees implies that the vehicle is positioned on one row to one side, and +90 degrees implies the vehicle is positioned in the space between rows to the other side. Other phase values indicate relative proportional positioning of the vehicle in terms of the amount of a row width to either side of center. The phase angle will typically be noisy so successive phase angles should be smoothed over time. From the smoothed position data represented by phase, a steering correction can be computed. The choice of algorithm for the steering computation is dependent on vehicle dynamics.

In agricultural applications, when the row spacing is known and hence the corresponding bin in the spectrum is also known, the periodicity of the crop is determined. The phase angle F(k) of this bin is computed in Step K. The phase angle of F(k) is the arc tangent of the real and imaginary terms of F(k) and reveals the spatial alignment of the sensor with respect to the average center of all the rows in view of the sensor. The sine of this phase angle times the period of the bin (which is equal to the average row spacing) is the vehicle's offset error with respect to the mean row-center. In Step M the steering correction signal can be derived as before by smoothing and damping the steering error over several sweeps. The result may become a steering message to be displayed to the driver, or it can be used as an automatic fine vernier to an automatic steering apparatus.

If the beam subtends, for example 15 rows, the cross-correlation offset or spectral phase angle is smoothed over 10 seconds and the vehicle is traveling at 7 MPH, the steering correction is computed from all the plants and soil surface in a 220 square-foot area simultaneously. Local anomalies in the row due to weeds, missing plants, erosion, etc. are averaged over the remaining surface to cause only a small degradation of the accuracy to which the steering correction can be computed, not a total loss of control as is common in prior methods.

I claim:

1. A method for controlling an agricultural vehicle comprising:

scanning a beam of wave energy through a scanning angle over a growing crop, receiving an analog signal from said growing crop, converting said analog signal to a digitized signal, analyzing the characteristics of said digitized signal to obtain information on the range of said growing crops from said agricultural vehicle and the angle of the scanning beam at a plurality of defined scan intervals, converting said range information to height data at each scan interval, extracting periodicity information from said height data, computing a steering error for said agricultural vehicle from said periodicity information after each sweep, and utilizing said steering error to control the direction of movement of said agricultural vehicle.

2. A method for controlling an agricultural vehicle comprising:

scanning a beam of wave energy through a scanning angle over a growing crop, receiving an analog signal from said growing crop, converting said analog signal to a digitized signal, analyzing the characteristics of said digitized signal to obtain information on the range of said growing crop from said agricultural vehicle, converting said range information to height data at each scan interval, computing the discrete complex Fourier transform of said height data, selecting the kth element of said discrete complex Fourier transform which is designated as F(k), where k is a function of the row spacing of said growing crop, computing the phase angle of said F(k), computing a steering error for said agricultural vehicle as a function of said phase angle of said F(k), and utilizing said steering error to control the direction of movement of said agricultural vehicle.

3. A method as claimed in claim 2 comprising the further step of multiplying said height data by a window function before said discrete complex Fourier transform of said height data is computed.

* * * * *

UNITED STATES PATENT AND TRADEMARK OFFICE

CERTIFICATE OF CORRECTION

PATENT NO. : 5,509,486

DATED : April 23, 1996

INVENTOR(S) : David P. Anderson

It is certified that error appears in the above-indentified patent and that said Letters Patent is hereby corrected as shown below:

Title page, Item [75] & [19]:

The inventor's name is -- David P. Andersen -- not "David P. Anderson"

Signed and Sealed this

Sixth Day of August, 1996

Attest:

Bruce Lehman

BRUCE LEHMAN

*Attesting Officer*

*Commissioner of Patents and Trademarks*